US008752008B2

(12) United States Patent
Herdeg et al.

(10) Patent No.: US 8,752,008 B2
(45) Date of Patent: Jun. 10, 2014

(54) LIGHTWEIGHT SERVICE BASED DYNAMIC BINARY REWRITER FRAMEWORK

(75) Inventors: Mark Herdeg, Waltham, MA (US); Steven T. Tye, Hopkinton, MA (US); Michael Bedy, Merrimack, NH (US); Anton Chernoff, Littleton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1170 days.

(21) Appl. No.: 12/552,740

(22) Filed: Sep. 2, 2009

(65) Prior Publication Data

US 2011/0055805 A1 Mar. 3, 2011

(51) Int. Cl.
*G06F 9/44* (2006.01)
*G06F 9/45* (2006.01)

(52) U.S. Cl.
USPC ........... 717/106; 717/124; 717/131; 717/145; 717/151; 717/159; 707/713; 707/715; 719/328; 719/331

(58) Field of Classification Search
None
See application file for complete search history.

(56) References Cited

U.S. PATENT DOCUMENTS

| | | | |
|---|---|---|---|
| 6,330,588 B1 * | 12/2001 | Freeman | 709/202 |
| 6,622,300 B1 * | 9/2003 | Krishnaswamy et al. | 717/130 |
| 7,146,607 B2 * | 12/2006 | Nair et al. | 717/151 |
| 7,752,255 B2 * | 7/2010 | Cohen et al. | 709/202 |
| 8,028,277 B2 * | 9/2011 | Breitgand et al. | 717/130 |
| 8,037,465 B2 * | 10/2011 | Tian et al. | 717/158 |
| 8,356,165 B2 * | 1/2013 | Tye et al. | 712/226 |
| 2005/0144602 A1 * | 6/2005 | Ngai et al. | 717/151 |
| 2007/0226698 A1 * | 9/2007 | Cascaval et al. | 717/127 |
| 2008/0126865 A1 * | 5/2008 | Lee | 714/34 |
| 2008/0271004 A1 * | 10/2008 | Choi et al. | 717/151 |

OTHER PUBLICATIONS

International Preliminary Report on Patentability for PCT Application No. PCT/US10/047280, mailed Mar. 15, 2012.
Arnold, M. et al., Adaptive Optimization in the Jalapeño JVM, ACM Sigplan Notices, Association for Computing Machinery, New York, NY, vol. 35, No. 10, Oct. 1, 2000.
Bala, V. et al., Transparent Dynamic Optimization: The Design and Implementation of Dynamo, HP Laboratories Technical Report, Jun. 1, 1999.
Wen-Ke, C. et al., Mojo: A Dynamic Optimization System, Third ACM Workshop on Feedback-Directed and Dynamic Optimization, Dec. 10, 2000, pp. 81-90.
Bruening, D. et al., An Infrastructure for Adaptive Dynamic Optimization, First International Symposium on Code Generation and Optimization: Feedback-Directed and Runtime Optimization, S.F. California, Mar. 23-26, 2003.
International Search Report and Written Opinion for PCT Application No. PCT/US10/047280, mailed Nov. 24, 2010.

* cited by examiner

*Primary Examiner* — Michael Sun
(74) *Attorney, Agent, or Firm* — Volpe and Koenig, P.C.

(57) ABSTRACT

A sampling based DBR framework which leverages a separate core for program analysis. The framework includes a hardware performance monitor, a DBR service that executes as a separate process and a lightweight DBR agent that executes within a client process. The DBR service aggregates samples from the hardware performance monitor, performs region selection by deducing the program structure around hot samples, performs transformations on the selected regions (e.g. optimization), and generates replacement code. The DBR agent then patches the client process to use the replacement code.

20 Claims, 12 Drawing Sheets

```
1 first_sr:=NEW-SR()
2 DISCOVER-HOT-CODE()
3 srs:=PARTITION-CODE(first_sr)
4 foreach sr in sers do COMPUTE-FALL-THROUGH-ONLY(sr)
5 INLINE-HOT-CALLS()
6 foreach sr in srs do
7     PATCH-POINT-SELECITON(sr)
8     PRUNE-CODE(sr)
```

```
 1  mapping, work_list ⇐ ∅
 2  procedure DISCOVER-HOT-CODE()
 3      foreach addr ∈ hot_samples do ENSURE-BB(addr, false, 0)
 4      PROCESS-WORK-LIST()
 5      DISCOVER-REGISTER-INDIRECT-CODE()
 6      MARK-UNPATCHABLE()
 7      mapping ⇐ ∅

8  procedure PROCESS-WORK-LIST()
 9      while work_list ≠ ∅ do
10          bb ⇐ work_list.remove
11          if bb.is_conditional then jfh ⇐ bb.jumps_from_hot + 1
12          else jfh ⇐ bb.jumps_from_hot
13          if jfh ≤ max_jumps_from_hot then
14              cfes ⇐ bb.successors
15              foreach cfe ∈ cfes do
16                  if cfe.target = first_sr.tail_bb then ENSURE-BB(cfe.address, true, jfh)
17                  else SET-JUMPS-FROM-HOT(cfe.target, jfh)

18  procedure ENSURE-BB(addr, starts, jfh)
19      (pos, ∅) ⇐ FIND-ENTRY(addr, starts)
20      if pos.entry then
21          if pos.entry.unsupported then return
22          if pos.entry.bb then SET-JUMPS-FROM-HOT(pos.entry.bb, jfh); return
23      (follow_pos, control_flow) ⇐ DISASSEMBLE-BB(pos)
24      if pos.address = follow_pos.address then SET-UNSUPPORTED(pos); return
25      merge ⇐ CAN-MERGE-ENTRY(control_flow, follow_pos)
26      if merge then  pos ⇐ MERGE-ENTRY(pos, follow_pos)
27      else pos ⇐ NEW-BB(pos, control_flow, follow_pos)
28      SET-JUMPS-FROM-HOT(pos.entry.bb, jfh)
29      foreach cfe ∈ pos.entry.pending_cfes do  cfe.target ⇐ pos.entry.bb
30      pos.entry.pending_cfes ⇐ ∅
31      if ¬ merge then ADD-CONTROL-FLOW(pos.entry, control_flow)

32  procedure ADD-CONTROL-FLOW(entry, control_flow)
33      foreach target ∈ control_flow.targets do
34          if target.is_known_address then
35              (target.pos, split_entry) ⇐ FIND-ENTRY(target.address, true)
36              if entry = split_entry then  entry ⇐ target.pos.entry
37              if ¬ target.pos.entry ∨ ¬ target.pos.entry.bb then
38                  cfe ⇐ NEW-CFE(entry.bb, first_sr.tail_bb, target)
39                  ADD-PENDING-CFE(target.pos, cfe)
40              else  NEW-CFE(entry.bb, target.pos.entry.bb, target)
41          else  NEW-CFE(entry.bb, first_sr.tail_bb, target)

42  function FIND-ENTRY(addr, starts) ↦ (pos, split_entry)
43      pos ⇐ GET-POSITION(addr)
44      split_entry ⇐ ∅
45      if starts ∧ pos.entry ∧ pos.entry.bb ∧ (pos.entry.bb.address ≠ addr) then
46          (top_pos, bottom_pos) ⇐ SPLIT-BB(pos, addr)
47          if work_list.member(top_pos.entry.bb) then
48              work_list.erase(top_pos.entry.bb)
49              work_list.insert(bottom_pos.entry.bb)
50          (pos, split_entry) ⇐ (bottom_pos, top_pos.entry)

51  procedure SET-JUMPS-FROM-HOT(bb, jfh)
52      if bb.jumps_from_hot > jfh then
53          bb.jumps_from_hot ⇐ jfh
54          work_list.insert(bb)
```

*Figure 10*

```
1  function PARTITION-CODE(initial_sr) ↦ srs
2    srs ⇐ SEPARATE-CONNECTED-COMPONENTS(initial_sr)
3    foreach sr ∈ srs do  CONNECT-TERMINALS(sr)

4  function SEPARATE-CONNECTED-COMPONENTS(sr) ↦ srs
5    srs, unassigned ⇐ ∅
6    foreach bb ∈ sr.bbs do
7      if bb ∉ [sr.start_bb, sr.tail_bb] then unassigned.insert(bb)
8    while unassigned ≠ ∅ do
9      if srs == ∅ then new_sr ⇐ sr
10     else new_sr ⇐ NEW-SR()
11     srs.insert(new_sr)
12     work_list ⇐ [unassigned.remove]
13     while work_list ≠ ∅ do
14       bb ⇐ work_list.remove
15       bb.set_sr(new_sr)
16       foreach cfe ∈ bb.predecessors do    // Explore BBs that can reach bb.
17         cfe.set_sr(new_sr)
18         if cfe.target == sr.start_bb then
19           cfe.target ⇐ new_sr.start_bb
20         else if unassigned.member(cfe.source) then
21           unassigned.erase(cfe.source); work_list.insert(cfe.source)
22       foreach cfe ∈ bb.successors do    // Explore BBs that bb can reach.
23         if cfe.target == sr.tail_bb then
24           cfe.set_sr(new_sr); cfe.target ⇐ new_sr.tail_bb
25         else if unassigned.member(cfe.target) then
26           unassigned.erase(cfe.target); work_list.insert(cfe.target)

27 procedure CONNECT-TERMINALS(sr)
28   (scc_count, scc) ⇐ STRONGLY-CONNECTED-COMPONENTS(sr)
29   // scc[bb] ↦ SCC index in the range 1..scc_count for basic block bb.
30   foreach i ∈ [1..scc_count] do
31     a_bb[i] ⇐ ∅                         // One of the SCC's basic blocks.
32     has_entry_cfe[i], has_exit_cfe[i] ⇐ false
33           // Does the SCC have a BB with a CFE from/to another SCC?
34   // Determine properties of each SCC.
35   foreach bb ∈ sr do
36     if bb ∈ [sr.start_bb, sr.tail_bb] then continue
37     i ⇐ scc[bb]
38     if ¬ a_bb[i] then a_bb[i] ⇐ bb
39     if ¬ has_entry_cfe[i] then
40       foreach cfe ∈ bb.predecessors do
41         if scc[cfe.source] ≠ i then has_entry_cfe[i] ⇐ true; break
42     if ¬ has_exit_cfe[i] then
43       foreach cfe ∈ bb.successors do
44         if scc[cfe.target] ≠ i then has_exit_cfe[i] ⇐ true; break
45   // Examine each SCC to see if it requires an entry/exit CFE.
46   foreach i ∈ [1..scc_count] do
47     bb ⇐ a_bb[i]
48     if ¬ bb then continue               // Ignore start and tail basic block SCCs.
49     if ¬ has_entry_cfe[i] then NEW-CFE(sr.start_bb, bb, entry)
50     if ¬ has_exit_cfe[i] then NEW-CFE(bb, sr.tail_bb, infinite loop)
51   if sr.tail_bb.predecessors == ∅ then
52     NEW-CFE(sr.start_bb, sr.tail_bb, empty sr)
```

*Figure 11*

```
1  procedure PATCH-POINT-SELECTION(sr)
2    root_loop ⇐ COMPUTE-LOOPS(sr)
3    // Build set of patches for root loop and its nested loops.
4    root_patches ⇐ PATCHES(root_loop, true, ∅, ∅)
5    foreach child_loop ∈ root_loop.children in DFS order do
6      patches ⇐ ∅
7      NESTED-PATCHES(child_loop, root_patches, patches)
8      root_patches ⇐ root_patches ∪ patches
9    // Remove original entry edges and create new patchable entry edges.
10   foreach cfe ∈ sr.start_bb.successors do DELETE-CFE(cfe)
11   foreach bb ∈ root_patches do
12     if bb.first_patchable ≠ bb.address then
13       bb ⇐ SPLIT-BB(bb, bb.first_patchable)
14     NEW-CFE(sr.start_bb, bb)

15 procedure NESTED-PATCHES(loop, root_patches, in out patches)
16   patches ⇐ patches ∪ PATCHES(loop, false, root_patches, patches)
17   foreach child_loop ∈ loop.children in DFS order do
18     NESTED-PATCHES(child_loop, root_patches, patches)

19 function PATCHES(loop, is_root, root_patches, patches) ↦ patches
20   // Compute loop body BBs not reachable from existing patches.
21   candidate_bbs ⇐ ∅
22   outer:
23   foreach bb ∈ loop.bbs do
24     if bb.is_unpatchable then continue outer
25     foreach existing_bb ∈ root_patches do
26       if SUPERCEDES(existing_bb, bb, true) then continue outer
27     foreach existing_bb ∈ patches do
28       if SUPERCEDES(existing_bb, bb, false) then continue outer
29     candidate_bbs.insert(bb)
30   // Find minimal set of patches.
31   patches ⇐ ∅
32   foreach bb_i ∈ candidate_bbs in DFS order do
33     candidate_bbs.erase(bb_i); patches.insert(bb_i)
34     foreach bb_j ∈ candidate_bbs do
35       if SUPERCEDES(bb_i, bb_j, is_root) then
36         candidate_bbs.erase(bb_j); patches.erase(bb_j)

37 function SUPERCEDES(bb_i, bb_j, is_root) ↦ supercedes
38   supercedes ⇐ DOM(bb_i, bb_j)
39   if ¬ is_root ∧ ¬ supercedes then supercedes ⇐ POST-DOM(bb_i, bb_j)
```

*Figure 12*

LIGHTWEIGHT SERVICE BASED DYNAMIC BINARY REWRITER FRAMEWORK

BACKGROUND OF THE INVENTION

1. Field of the Invention

The present invention relates to information handling systems and more particularly to monitoring execution of a program and more particularly to a dynamic binary rewriter.

2. Description of the Related Art

When monitoring a computer application program executing in a client process, a monitor program may need to analyze the client process to determine regions of more frequently executed code (i.e., hot code). Such monitoring can occur in systems when the original source code of the application cannot be easily modified or recompiled. When the only information available to the monitor is runtime information, locating and constructing these regions can be challenging.

It is known to use a dynamic binary optimizer (DBO), a specific type of dynamic binary rewriter (DBR), to monitor the execution of a program and to optimize frequently executed (i.e., hot) code to improve performance. Known DBOs generally fall into two categories, Interpretation based DBOs and Sampling based DBOs. An interpretation based DBO leverages an interpreter or just-in-time compiler to observe a program's dynamic instructions. A sampling based DBO removes the interpreter and uses low overhead sampling based techniques to identify hot code. Known DBOs select hot traces for transformation. A trace is a single entrance, multiple exit interprocedural path of execution.

A DBR is similar to a managed run time environment except that a DBR operates on native binaries without requiring any static program information.

SUMMARY OF THE INVENTION

In accordance with the present invention, a sampling based DBR framework is set forth which leverages a separate core for program analysis. The framework includes a hardware performance monitor, a DBR service that executes as a separate process and a lightweight DBR agent that executes within a client process. The DBR service aggregates samples from the hardware performance monitor, performs region selection by deducing the program structure around hot samples, performs transformations on the selected regions (e.g. optimization), and generates replacement code. The DBR agent then patches the client process to use the replacement code.

The DBR operates on native binaries without requiring prior static information. Thus, the DBR can transform legacy binaries or libraries for which source code is unavailable. Also, by operating at run time, the DBR leverages transformation opportunities that may not be available at compile time. For example, a DBR can perform transformations based upon the behavior of the current program input, tune a program to a specific underlying architecture and perform transformations across dynamically linked libraries.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 10 shows a pseudo code representation of a hot code discovery operation.

FIG. 11 shows a pseudo code representation of a code partitioning operation.

FIG. 12 shows a pseudo code representation of a patch point selection operation.

DETAILED DESCRIPTION

Figure 1:
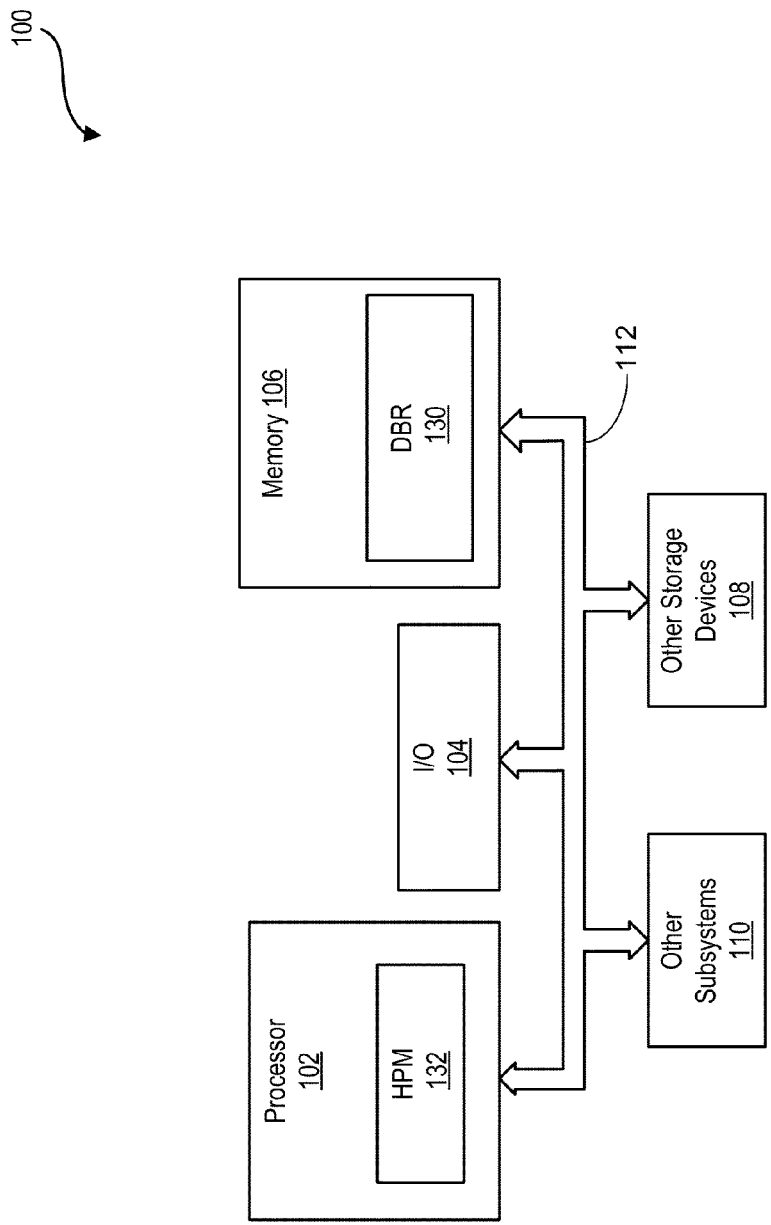
FIG. 1 shows a system block diagram of computer system having a dynamic binary rewriter.

Referring briefly to FIG. 1, a system block diagram of a computer system 100 is shown. The computer system 100 includes a processor 102, input/output (I/O) devices 104, such as a display, a keyboard, a mouse, and associated controllers (each of which may be coupled remotely to the computer system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

The computer system further includes a dynamic binary rewriter 130 stored in the memory 106 and executable by the processor 102 (or a core within the processor or on a separate but coupled processor (not shown)). The dynamic binary rewriter 130 interacts with a hardware performance monitor (HPM) 132 which is contained within the processor 102. In one embodiment, the hardware performance monitor 132 supports instruction based sampling (IBS). Instruction based sampling is a statistical sampling technique that precisely attributes architectural events to specific instructions. In certain embodiments, IBS tags an instruction during the fetch stage at each sampling interval. Any architectural events that occur during the execution of tagged instruction are reported in HPM generated samples. Other embodiments may use other methods for attributing architectural events to specific instructions and reporting those events.

Figure 2:
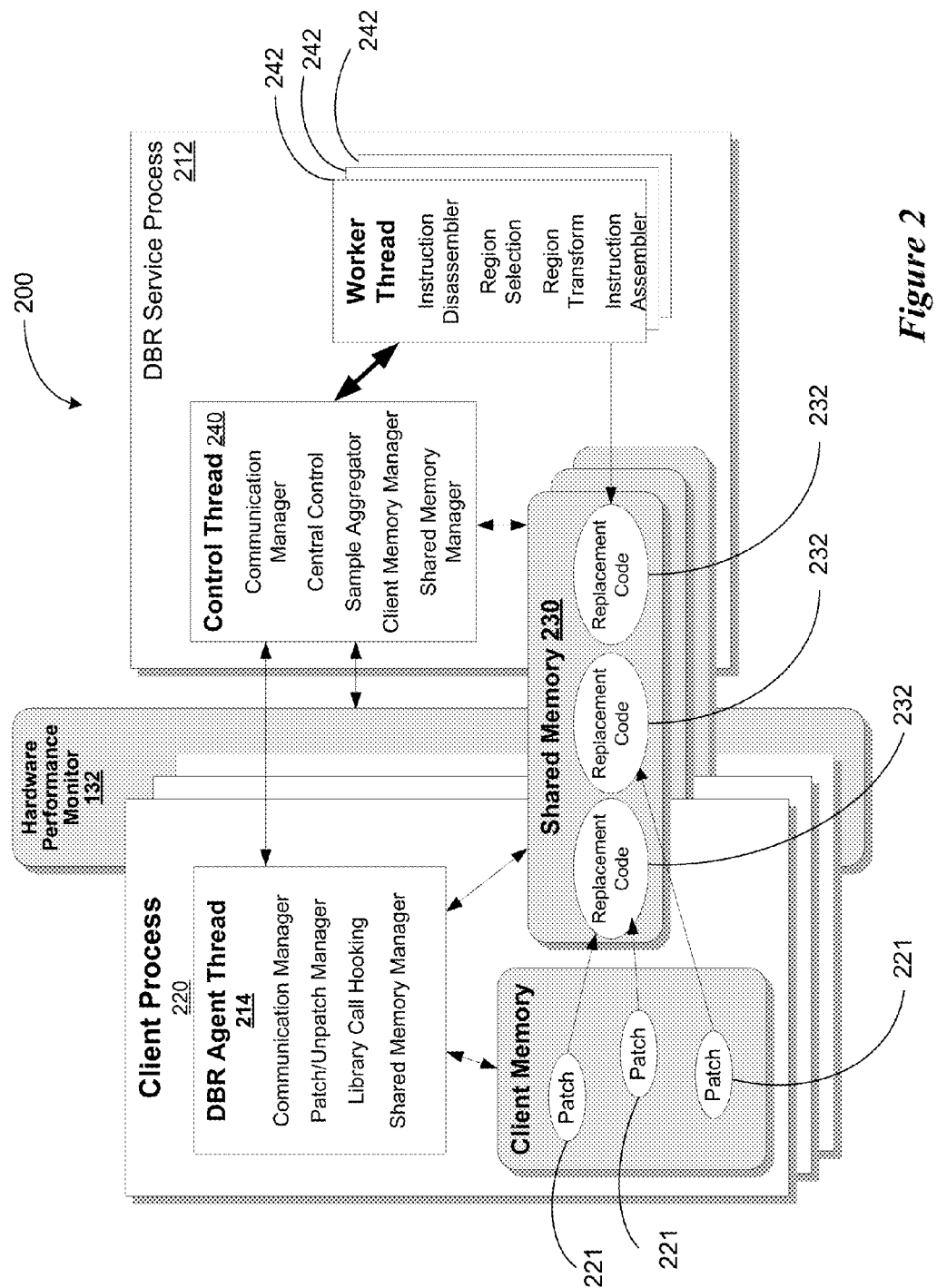
FIG. 2 shows block diagram of a service based dynamic binary rewriter framework.

Referring to FIG. 2, a block diagram of a service based dynamic binary rewriter framework 130 is shown. More specifically, the DBR framework 130 uses a sampling based approach. The service based dynamic binary rewriter framework 130 includes the hardware performance monitor 132, a DBR service process 212 and a lightweight DBR agent 214. The DBR service process 212 runs as a separate process and the lightweight DBR agent runs within a client process 220. The HPM 132 provides low overhead profiling. The DBR service process 212 aggregates samples from the HPM 132 and analyzes the aggregated samples to perform region selection and replacement code generation. The DBR agent 214 then patches 221 the client process 220 to execute the replacement code. By decoupling the DBR service process 212 from the client process execution, the method performs substantial analysis while minimizing performance impact on the client process.

The service based dynamic binary rewriter framework 200 uses sampling to collect a plurality of types of information regarding execution of the client process. In some embodiments, instruction based sampling is used to collect the information. Other embodiments may use other sampling methods. More specifically, the plurality of types of information includes instruction pointer address information, branch direction information and may also include additional information including, but not limited to, load target address information. The instruction pointer (IP) address information includes the address of the instruction associated with a sample. The branch direction information includes the value of the condition if the sample instruction is a conditional branch instruction. The load target address information includes an address of memory location read if a sampled instruction is a load.

The DBR agent 214 is a lightweight shared library that executes within the client process. At startup, the DBR agent 214 is automatically loaded into a client process address space and initialized. The initialization creates a new thread within the client process 220 in which the DBR agent 214 operates. The DBR agent 214 configures a communication connection with the DBR service process 212 and allocates a shared memory space 230 which holds replacement code 232. While managing the connection, the DBR agent 214 responds to messages such as requests to patch and unpatch replacement code that has been directly placed in the shared memory by the DBR service process 212. The DBR agent 214 also performs several miscellaneous tasks including hooking library calls that may require attention (e.g., thread creation and page protection changes) and performing error handling (e.g., loss of communication with the DBR service process 212).

The DBR service process 212 operates in a separate process from the client process 220 and in some embodiments may execute on a separate processor core (on multi-core systems) or on a separate processor (on multi-processor systems). By decoupling the DBR service process 212 from the client process, the DBR service process 212 can execute concurrently with the client process 220. Also, the decoupling minimizes memory usage and avoids shared libraries with the client process. Also, the decoupling allows a single DBR service process to support multiple client processes and to manage resources with a system wide scope.

The DBR service process 212 includes a control thread 240 which manages communication with all the DBR agents and coordinates various aspects of the DBR service. When a new client process starts, a respective DBR agent connects to the DBR service. On initial connection, the control thread obtains information about the client process and the shared memory area 232 created by the DBR agent. The control thread 240 maps the shared memory 232 address space into the address space of the DBR service process 212. The control thread 240 may determine that the client process is executing a program that should not be modified and can disable further handling by the DBR 130.

The control thread 240 periodically activates the HPM 132 for a short period to collect a profile snapshot. The control thread 240 receives the samples from the HPM 132 and aggregates the samples based on the client process and IP addresses. By only activating the HPT 132 for short periods, the client process is left to execute unencumbered by the sample collection overhead most of the time. By adjusting the length of the period, the DBR 132 can balance the overhead of sampling against the benefits of generating replacement code. By intermittently activating the HPM 132, the DBR 132 can respond to phase transitions that may occur in the client process program execution. In some embodiments, the overhead of sampling might be low enough to allow continuous use of the HPM 132 rather than periodic use.

The DBR service process 212 also includes a pool of worker threads 242, which are created by the control thread 240. After a profile snapshot has been taken, the control thread 240 determines how many worker threads can be deployed concurrently based on overall system load. The control thread 240 also determines which client processes should be modified (if any) and in what order. The control thread 240 then starts the worker threads and waits for them to complete before sleeping until the next snapshot interval. The control thread 240 can also evaluate the effectiveness of the replacement code and unpatch the replacement code if appropriate. For example, the control thread 240 can monitor the proportion of samples in a snapshot that are in replacement code.

Once a worker thread 242 has been activated, the worker thread performs region selection and generation of replacement code for a specific client process. The worker thread 242 uses facilities provided by the control thread 240 to access the aggregated samples, to read the client process address space, to place the replacement code in the shared memory of the client process and to notify the DBR agent 214 to install the patches. Replacement code is not used if the address mapping of the client process has changed in ways that are incompatible with the state at the time that region selection and replacement code generation was originally performed (e.g., code or data that was referenced is contained in a library that has been unloaded or page protections have been updated so they are no longer read only). The DBR service process 212 and DBR agent 214 cooperate to ensure that replacement code is not installed or is unpatched if such events occur.

Figure 3:
FIG. 3 shows a pseudo code representation of a region selection operation of the dynamic binary rewriter.

Referring to FIG. 3, a pseudo code representation of a region selection operation of the dynamic binary rewriter 130 is shown. More specifically, the DBR 130 incorporates a region selection operation 300 to identify areas of hot code without any prior static knowledge of the program. The DBR region selection operation 300 represents its results in an intermediate representation (IR) as super-regions (SRs). Super-regions can represent arbitrary control flow and may contain code from multiple nested loops and span multiple procedure boundaries. Within a super-region, the IR represents control flow as a single entrance, single exit directed acyclic graph.

The nodes of the graph are basic blocks (BBs), and the edges are control flow edges (CFEs). Each SR contains a plurality of basic blocks. More specifically, each SR includes a start basic block, a tail basic block and zero or more body basic blocks. A start basic block is a pseudo basis block that provides a common entry point. Edges exiting the start block are termed entry edges and are pseudo edges that denote entering replacement code from the original client code. A tail basic block is a pseudo basic block that provides a common exit point. Edges entering the tail block are termed exit edges and are pseudo edges that denote leaving replacement code and continuing execution in the original client code. Body basic blocks represent real program code. Body basic blocks are transformed to generate the replacement code.

In the final super-regions produced by the region selection operation 300, the body basic blocks form a single connected component in which the entry edges define the patch points (i.e., the addresses in the client program that are patched to enter the replacement code). The single entry and exit of a super-region makes it amenable to traditional compiler analysis and optimization.

The region selection operation 300 starts by performing a hot code discovery operation. Next, the region selection operation 300 performs a code partitioning operation. Next, the region selection operation 300 performs a fall through only computation and a hot call inlining operation. Next, the region selection operation 300 performs a patch point selection operation and a code pruning operation.

Figure 4:
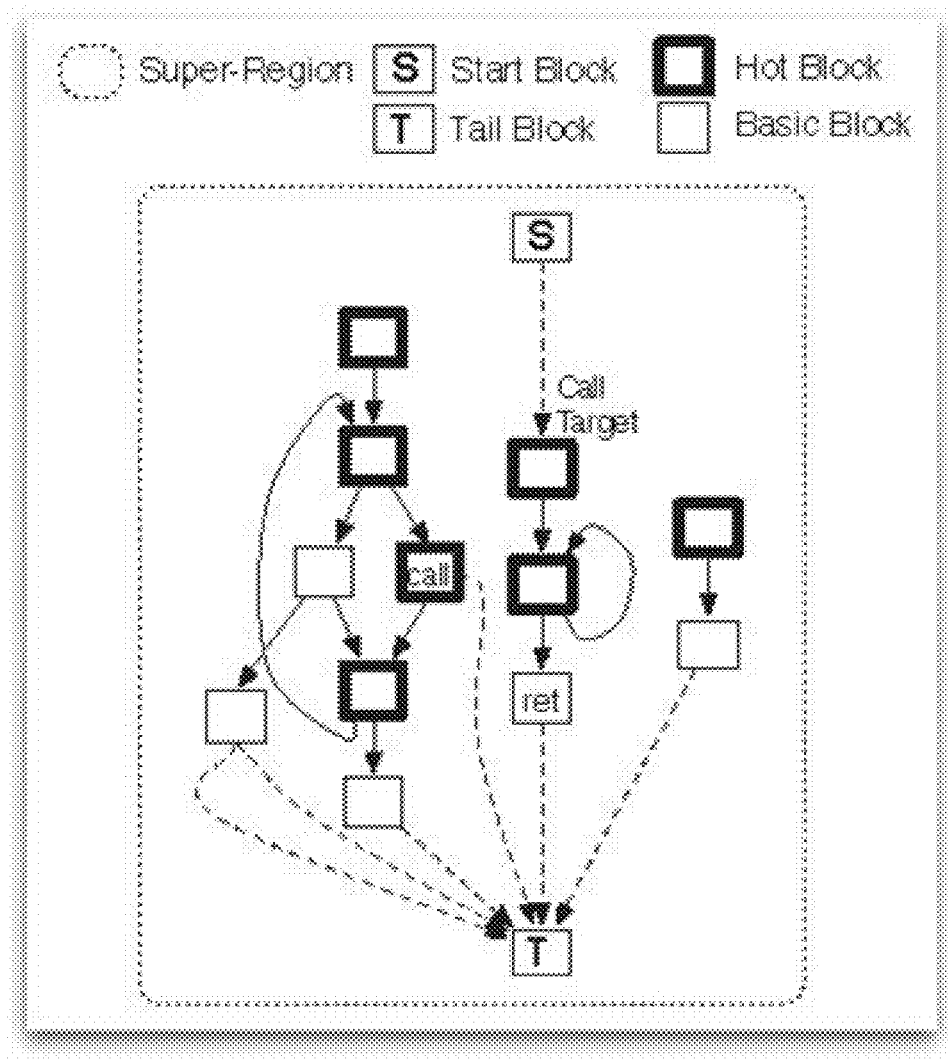
FIG. 4 shows a block diagram of a result of performing a hot code discovery operation of a dynamic binary rewriter on an example client program.

Referring to FIG. 4, a block diagram of the result of performing the hot code discovery operation of a dynamic binary rewriter 130 on an example client program is shown. The hot code discovery operation uses aggregated HPM samples as seed address for hot sample basic blocks. The hot code discovery operation disassembles the client code forward following the control flow. Discovery is throttled by venturing a specified number of conditional jumps away from basic blocks that are hot. The result is a single super-region that contains a set of basic blocks that are connected to represent the client program structure around the hot instructions.

Figure 5:
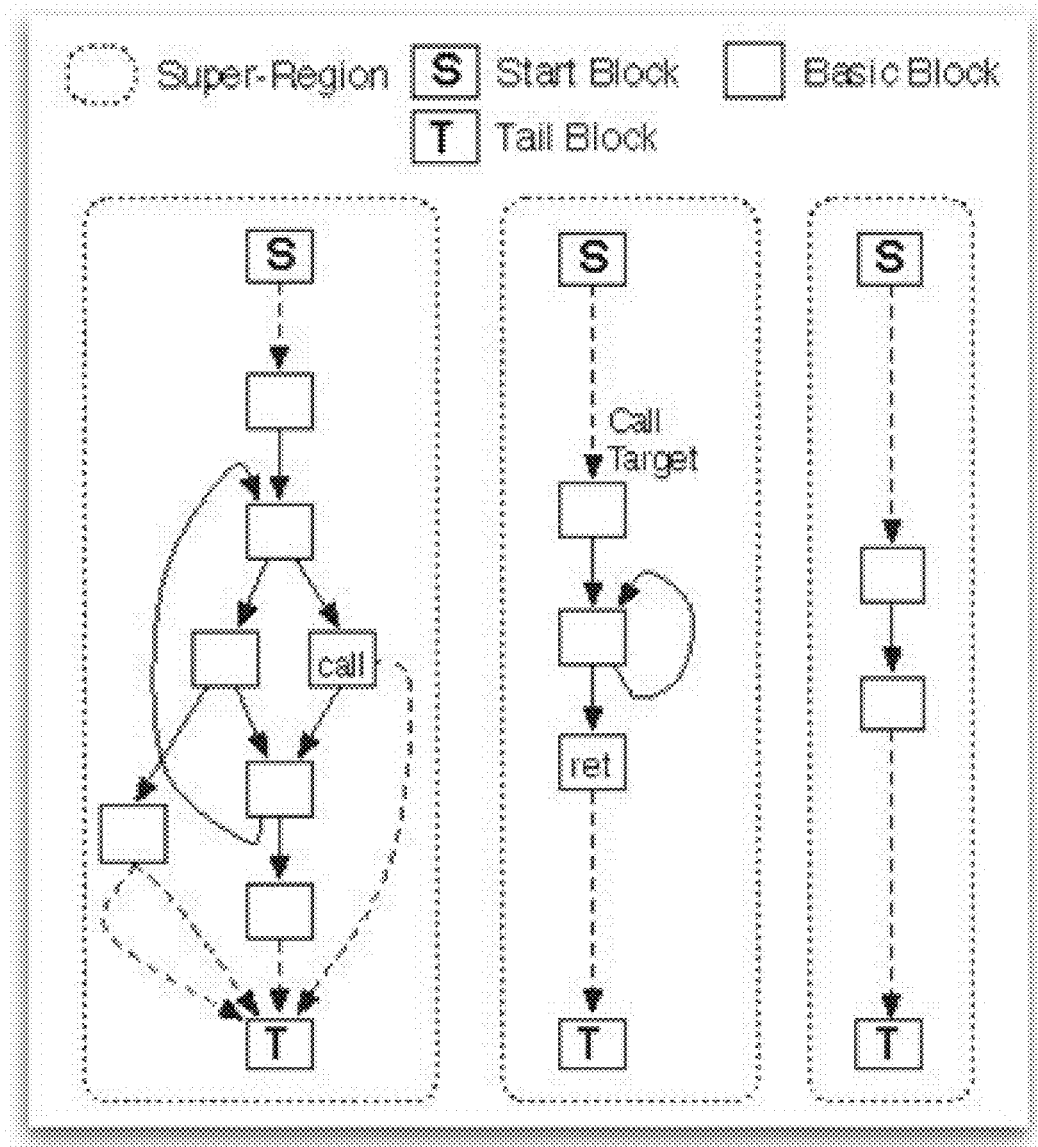
FIG. 5 shows a block diagram of a result of performing the code partitioning operation of a dynamic binary rewriter on an example client program.

Referring to FIG. 5, a block diagram of the result of performing the code partitioning operation of a dynamic binary rewriter 130 on an example client program is shown. The code partitioning operation moves the basic blocks and the control flow edges of each connected component of a single super-region control flow graph into a separate super-region. The code partitioning operation also adds any necessary entry and exit edges to ensure that the start block dominates and tail block post dominates all of the basic blocks of the separate super-region.

While the hot code discovery operation is disassembling instructions, the hot code discovery operation consults the sample aggregator and records the sample counts on the basic blocks and control flow edges that are created. Because a basic block that falls through only to its successor has not explicit branch instruction, no samples are available to record on the control flow edge. Accordingly, an approximation of the count is computed by the fall through only computation operation (see e.g., FIG. 3) from the counts of the non fall through only control flow edges.

Figure 6:
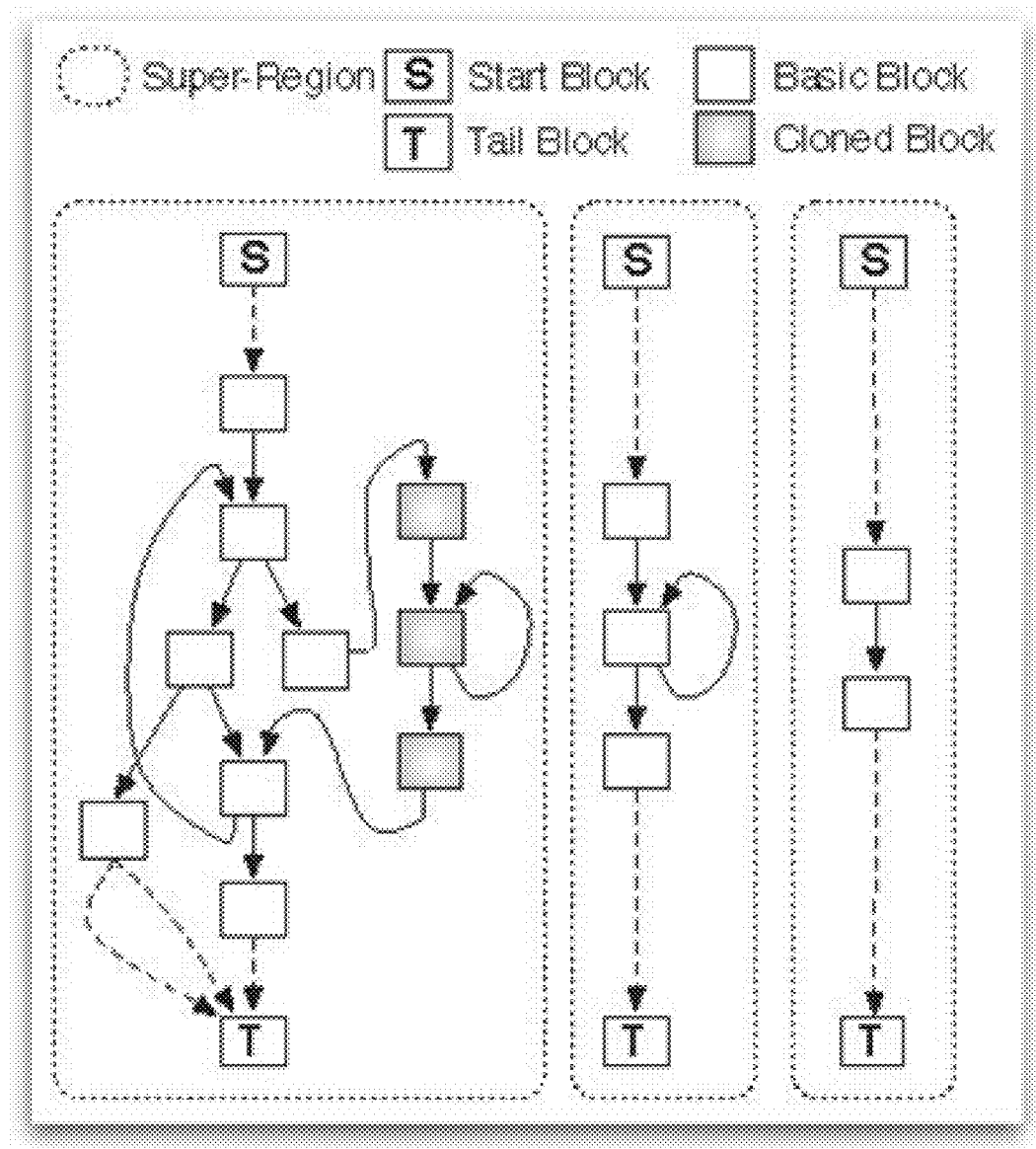
FIG. 6 shows a block diagram of a result of performing the hot call inlining operation of a dynamic binary rewriter on an example client program.

Referring to FIG. 6, a block diagram of the result of performing the hot code inlining operation of a dynamic binary rewriter 130 on an example client program is shown. The hot call inlining operation determines if any of the hot basic blocks include a call instruction and there is a super-region with a basic block that corresponds to the target address from which a return instruction is reachable. If these conditions are true then the hot call inlining operation inlines the routine.

Figure 7:
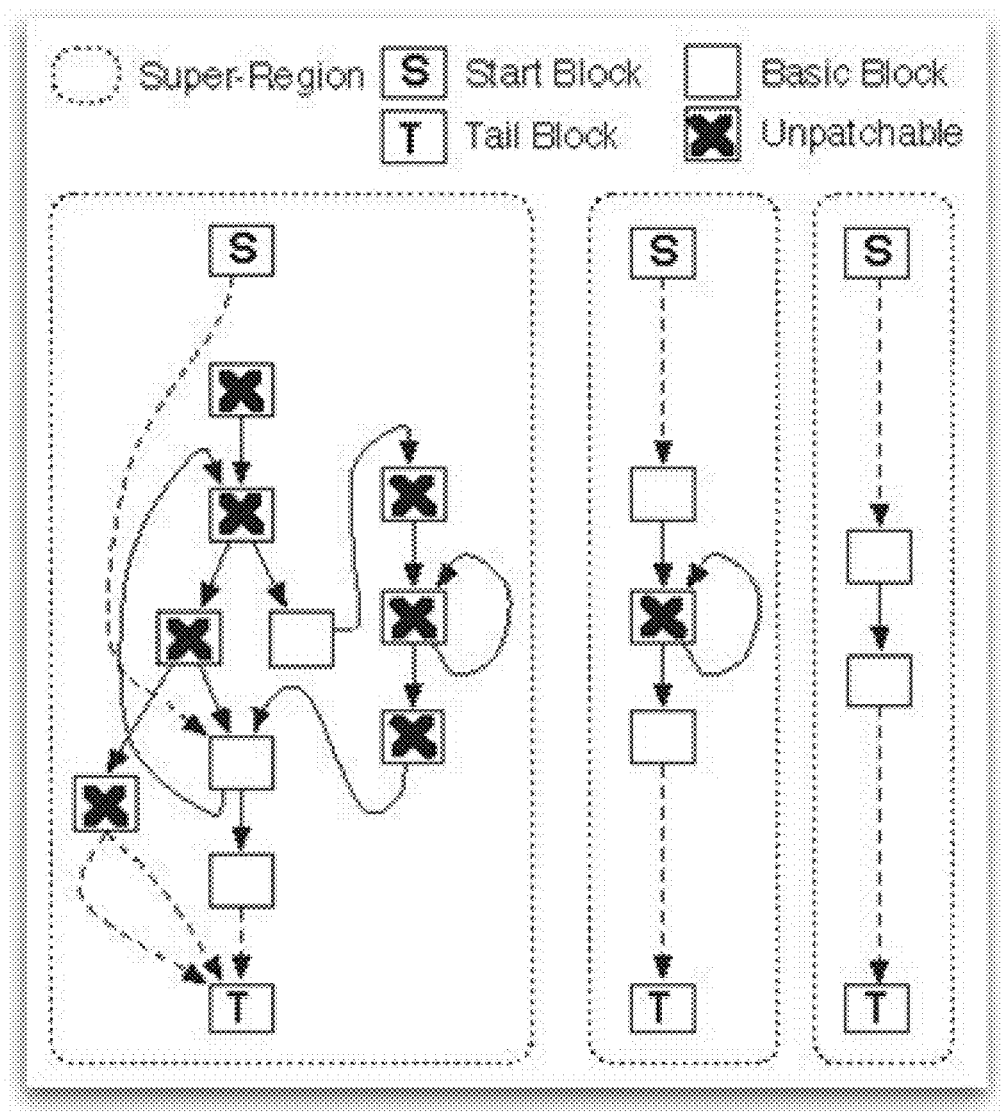
FIG. 7 shows a block diagram of a result of performing the patch point selection operation of a dynamic binary rewriter on an example client program.

Referring to FIG. 7, a block diagram of the result of performing the patch point selection operation of a dynamic binary rewriter 130 on an example client program is shown. Not all basic blocks in a super-region created by the hot code discovery operation can be patched. The patch point selection operation of the DBR 130 uses dominator and loop analysis to identify a good set of patch points for each super-region.

Figure 8:
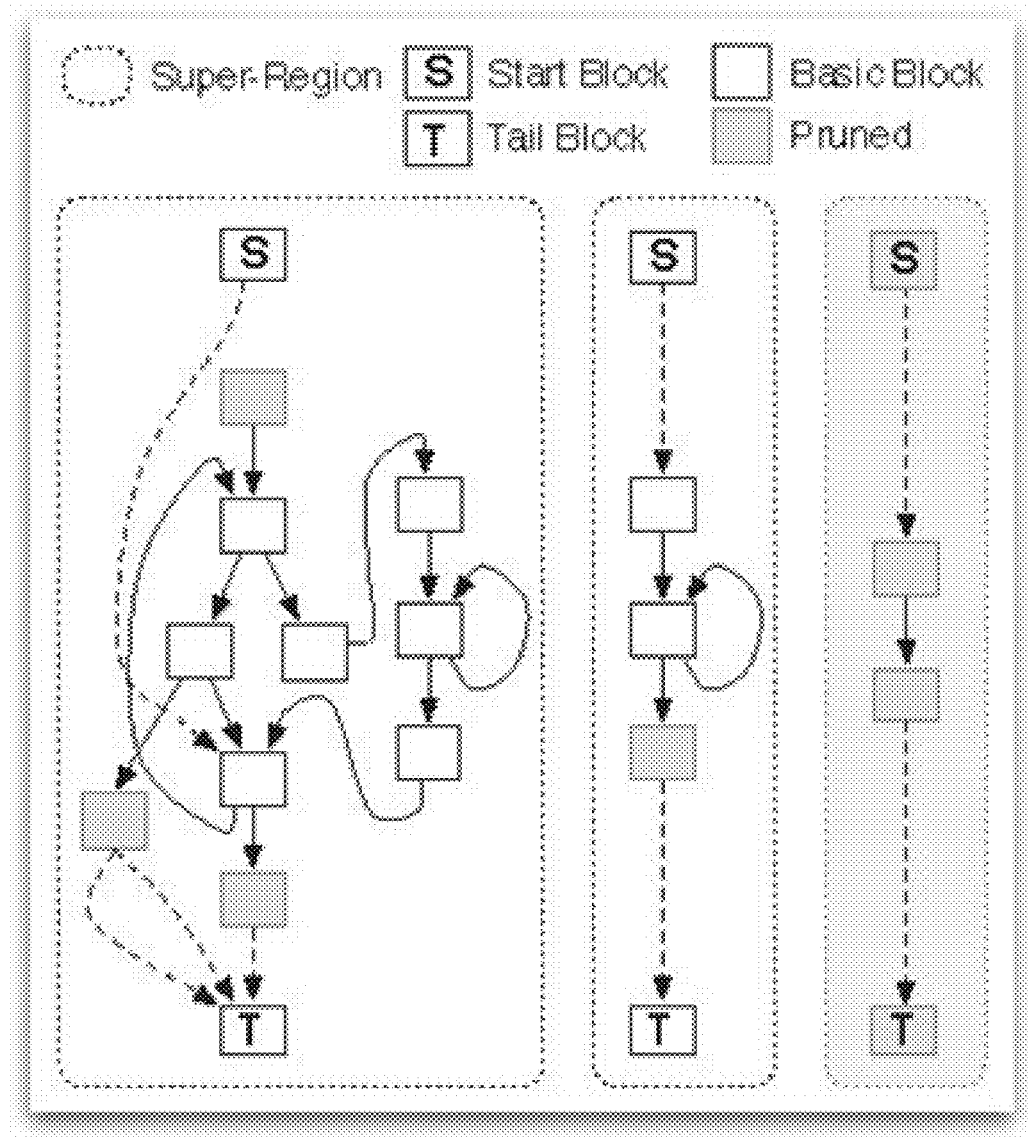
FIG. 8 shows a block diagram of a result of performing the code pruning operation of a dynamic binary rewriter on an example client program.

Referring to FIG. 8, a block diagram of the result of performing the code pruning operation of a dynamic binary rewriter 130 on an example client program is shown. With the code pruning operation, super-regions that have no loops, are considered too small, or have no patch points are deleted. Any cold tail basic blocks that simply exit a super-region, together with any unreachable basic blocks caused within a patch point selection operation changing entry edges, are also deleted.

Figure 9:
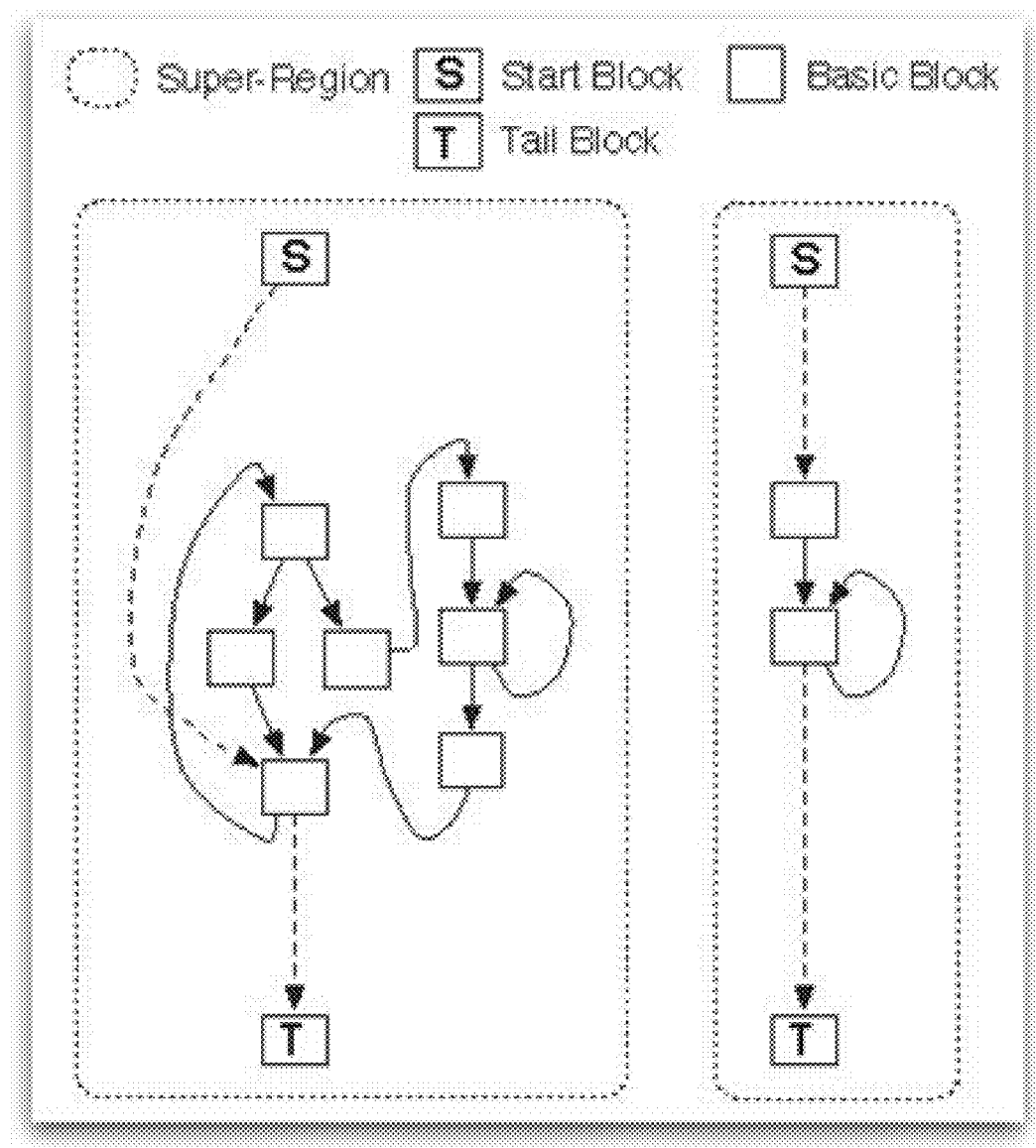
FIG. 9 shows a block diagram of a result of performing a complete region selection operation of a dynamic binary rewriter on an example client program.

Referring to FIG. 9, a block diagram of the result of performing the complete region selection operation 300 of a dynamic binary rewriter 130 on an example client program is shown. The final super-regions created are shown.

Referring to FIG. 10, a pseudo code representation of one embodiment of a hot code discovery operation is shown. In the DBR 130, the client process may be executing binaries that are stripped of all static program information (e.g., symbol table and debug information). Thus, the hot code discovery operation dynamically discovers the structure of the program without this information. Some control flow, such as indirect calls, indirect jumps, and returns can be difficult to follow if the HPM 132 does not provide adequate information. Even regular calls can present difficulties because the DBR 130 may not be sure if they ever return (such as calling a routine like EXIT). The compiler may place these at the end of the routine's code immediately followed by the routine's data (such as jump tables).

Variable-length instruction set architectures (ISAs), (such as may be present within processor architectures like the x86 processor architecture) present another challenge. Given a known instruction address, the DBR 130 can only disassemble forward. Variable-length encoding makes it extremely difficult to distinguish the start of prior instructions. If incorrect assumptions about control flow are made, the DBR 130 can end up disassembling bytes in the middle of real instructions.

Accordingly, the hot code discovery operation explores the control flow of the client program starting at the hot instructions identified by the aggregated HPM samples. All the basic blocks and control flow edges it creates are allocated in the single super-region, first_sr, which is allocated during the region selection operation.

As the hot code discovery operation incrementally explores, the operation tracks knowledge about each client address that is, or potentially may become, the beginning of a basic block. The hot code discovery operation does this with the mapping data structure, which contains a separate entry for each such address. If the address has been successfully disassembled, then the hot code discovery operation records the basic block created together with its size and instruction boundaries. If the address has not yet been disassembled, then its size is temporarily assumed to be a single byte and the set of control flow edges that have already been created and target that address are recorded. These control flow edges are initially created as exit edges to the tail basic block but, when or if the address is disassembled, the control flow edges are updated to have the new basic block as their target. Additionally, if it is determined that an address cannot be disassembled, then that fact is recorded and all control flow edges to it will remain exiting edges. The mapping structure ensures that each instruction is only disassembled once and supports the incremental nature of the discovery process.

To manage the incremental exploration, a work list is used by the hot code discovery operation, which contains already discovered basic blocks that may require their successor control flow to be followed. When a basic block is first created, the basic block is always put on the work list. The hot code discovery operation begins by querying the sample aggregator for the set of addresses that correspond to the hot samples. For each of these addresses, the hot code discovery operation ensures there is a basic block by calling the ENSURE-BB function. Since a basic block can contain multiple instructions that have samples, starts is passed as false. This indicates that the basic block does not need to start at the requested address, but only needs to contain the requested address as an instruction boundary.

Next, the function PROCESS-WORK-LIST is called, which continues to take a basic block from the work list, and process the basic block, until the work list is empty. Processing a basic block comprises ensuring that each of its successor control flow edges has a target basic block, which may in turn add further basic blocks to the work list. To throttle on how far away from hot code the discovery will explore, each basic block is tagged with jumps-from-hot, the number of conditional jumps it is away from a hot sample basic block. Any basic block that contains a hot sample, or is unconditionally reachable from such a basic block, has a jumps-from-hot value of 0. Hence jfh is passed 0 for the hot sample basic blocks. Successor control flow edges are only followed if they are under the limit of jumps-from-hot. The statistical nature of sampling can cause code that is actually hot not to get a fair number of samples. This is particularly problematic for very small basic blocks. The jumps-from-hot mechanism smooths away these artifacts. The jumps-from-hot mechanism also serves to cause short, but less frequently executed, paths away and back to hot code to be included in the SR. This avoids exiting the super-region and losing the benefit of the replacement code, while limiting the amount of non-hot code included.

If the successor control flow edge is an exiting edge, then the function ENSURE-BB is called for the control flow edge's target address. In this case, the basic block does need to start at the address since the source basic block is transferring to it. Otherwise the function SET-JUMPS-FROM-HOT is called on the target basic block. If the supplied jumps-from-hot is less than the basic block's current value, then the basic block is updated and put back on the work list. This will allow the lower value to be propagated to its successors, which may result in exploring control flow edges that were previously over the limit.

Following control flow paths that are not in fact ever executed can cause bytes to be disassembled that are not instructions. These bytes may even overlap with actual instructions that are reachable by following some other control flow path. To handle this, the mapping allows multiple entries to exist that cover the same addresses (the only rule is that they have disjoint instruction boundaries). To ensure this, the function DISASSEMBLE -BASIC-BLOCK needs to cheaply determine if the address of the next instruction coincides with the instruction boundary of an existing entry when disassembling instructions.

This determination is achieved cheaply by the position data structure, which records information about overlapping entries in mapping, if any, that have a range that includes the address at which it is positioned. In addition, a position records which, if any, of the overlapping entries has the address as one of its instruction boundaries (there can be at most one due to the disjoint instruction boundary requirement.) This is termed the match entry (accessed by .entry notation in the hot code discovery operation). Finally, the position also records information about the following entry. The following entry is the one with the least address greater than the position's address (again, there can be at most one of these, for the same reason). A position can be advanced cheaply to a new address and incrementally updates all its recorded information.

To facilitate computing the overlapping entries for an address, an entry records its parent entry, the lowest addressed overlapping entry, if any. This limits the search that should be done (by the function GET-POSITION), usually to zero since the conditions for overlapping code are rare. Conversely, when entries are created or updated (by the functions NEW-BB, MERGE-ENTRY, et al.), a position is always provided that contains the overlapping entries needed to cheaply compute the parent entry and to determine which other entries may also need their parent entry updating.

The function ENSURE-BB uses the function FIND-ENTRY to determine if there already is an entry that contains the addr. If the function FIND-ENTRY was requested to return an entry that starts at the address, then the FIND-ENTRY function checks the position returned by the function GET-POSITION to determine if it has a match entry that has a basic block (indicating the address has already been disassembled). If so, then the function FIND-ENTRY splits the entry and associated basic block if the address is not the start of the basic block. If the basic block was on the work list, then it can be exchanged for the new basic block corresponding to the bottom part of the split. This is because a basic block is on the work list to explore its successors, and the basic block for the top part of the split basic block only has a fall-through-only control flow edge, and it is the bottom part that now has the control flow that needs exploring.

The position returned by the function FIND-ENTRY to the function ENSURE-BB is checked to determine if the position has a match entry indicating an existing entry already has the address as an instruction boundary. If the match entry has been marked as unsupported, then there can be no basic block created at that address. If invoked on behalf of a control flow edge's target, then the control flow edge will remain an exiting edge. If the match entry has a basic block, then the entry has already been disassembled and no further action is required. However, the jumps-from-hot of the basic block is updated in case jfh is lower, in which case the basic block would be put back on the work list so that the lower value can be propagated.

At this point the DBR 130 knows that no instruction has previously been disassembled starting at addr (otherwise, there would have been an entry containing it). Therefore the DBR 130 calls the DISASSEMBLE-BB function, which disassembles instructions and advances the position until any of a number of conditions is present. More specifically, the DBR 130 disassembles instruction sand advances the position until the DBR 130 reaches a control transfer instruction, encounters an unsupported or illegal instruction, or attempts to access non-existent or non-read-only executable client memory. Additionally, some instructions are required to be in their own basic block. Alternately, the DBR 130 disassembles instruction sand advances the position until after advancing position, the position has a match entry, indicating that the DBR 130 has either reached the following entry or has synchronized with an instruction boundary of an overlapping entry. Alternately, the DBR 130 disassembles instruction sand advances the position until the DBR 130 encounters any bytes that are part of a patch instruction (determined by consulting the shared memory manager). A patch can only go to one location, and it is not desirable for the DBR 130 to produce multiple versions of replacement code for the same client code because that would reduce the effectiveness of code locality. The control thread can monitor the effectiveness of replacement code and choose to remove it, allowing the associated client code to become a candidate again.

The DISASSEMBLE-BB function returns the position of the address following the last instruction of the basic block together with control flow which includes the address of all the control flow targets of the BB, the sample counts for all the targets, the total sample count of the instructions, the address of the first instruction with samples the first patchable instruction, and the instruction boundaries.

The target addresses of control flow instructions are determined by one of a plurality of methods. (1) If the last instruction is a conditional jump, the function DISASSMBLE-BB uses HPM branch direction sample information. (2) For memory indirect control transfers, the function DISASSMBLE-BB uses the literal address or HPM load target address sample information as appropriate. The function DISASSMBLE-BB reads those locations to find the possible target addresses. (3) If loading from read-only memory, the function DISASSMBLE-BB trusts the address; otherwise the function DISASSMBLE-BB only trusts the address if it also has samples, since the location could have been changed since the instruction was executed. (4) For non-literal read-only memory indirects, the function DISASSMBLE-BB also includes a pseudo-unknown-target that denotes that there may be other targets. (5) Register indirect is handled by a DISCOVER-REGISTER-INDIRECT-CODE function. (6) If a HPM 132 is available that provides target addresses directly, the function DISASSMBLE-BB can use that information instead.

Note that the DISASSEMBLE-BB function may be unable to disassemble any instructions. In this case, the ENSURE-BB function calls the SET-UNSUPPORTED function, which creates an entry in the mapping if necessary and marks the entry as unsupported. Any pending control flow edges will remain exiting edges.

If the following position indicates there is a matching entry at that address, the ENSURE-BB function calls the CAN-MERGE-ENTRY function to check whether the matching entry can be expanded to also include the instructions just disassembled. This condition can happen if the following entry was created from a hot sample that happened to be in the middle of a real basic block. Merging can occur if all the following are true. (1) The value of control_flow indicates the disassembled instructions ended with fall-through-only. (2) The following position has a match entry. (3) That match entry starts at the following position's address. This condition will not be the case if the DISASSEMBLE-BB function synchronized with an overlapping entry. In that case, the overlapping entry must be split, which will happen automatically when the ENSURE-BB function adds the fall-through control flow edge. (4) The following entry has a basic block with no predecessor control flow edges and does not have an instruction that has to be in its own basic block. Entries without a basic block are either unsupported or created as the target of pending control flow edges, so cannot be merged.

The MERGE-ENTRY function performs the merge operation by deleting the mapping entry specified by the value of pos.entry if one exists, updates the information of the following entry and its associated basic block to start at the new address, and returns an updated position. Otherwise, the NEW-BB function is called to create a basic block and associate the basic block with the mapping entry specified by pos.entry, creating one if necessary. In either case, the function SET-JUMPS-FROM-HOT is called by the ENSURE-BB function to update the basic block's jumps-from-hot and add the basic block to the work list if necessary (which will always happen for new basic blocks since they are created with infinity as the default). If the mapping entry specified by the value of pos.entry has any pending control flow edges, the control flow edges are all updated to connect to the newly created basic block instead of being exiting edges.

The ADD-CONTROL-FLOW function is called by the ENSURE-BB function if a new basic block was created. This function creates control flow edges for each of the targets of the basic block. If there is an entry with a basic block for the target, then the control flow edge simply connects to it; otherwise, an exiting control flow edge is created to the tail basic block and the ADD-PENDING-CFE function is called to add the control flow edge to the pending control flow edges of the entry for the target address, creating one if necessary. Any unknown targets are connected to the tail basic block; no entry is created for the unknown targets because these targets do not have an address. These exiting control flow edges denote the consequence of an indirect transfer going to a target other than those explicitly represented by other control flow edges.

To facilitate the INLINE-HOT-CALLS function, the control flow of calls is represented specially. First, the DBR 130 always assumes the call instruction will return and follows the control flow after it. This ensures that the DBR 130 has the complete control flow graph needed for inlining Note that this may not in fact always be true (e.g., a call to a routine that the compiler knew never returned, or returns in a non-standard way such as by adjusting the return address to skip literal argument data that was placed after the call), but the MARK-UNPATCHABLE function mitigates this problem. Second, the DBR 130 represents the control flow from the call to the call target basic block as two control flow edges: one from the call to the tail basic block, and one from the start basic block to the call target basic block. These conventions allow the PARTITION-CODE function to segregate the code for different routines into separate super-regions which also aids the inliner.

The NEW-CFE and NEW-BB functions take care of this issue automatically. If the call target basic block already exists when the NEW-CFE function is asked to make a call edge, the function immediately creates the entry control flow edge. Otherwise, the function marks the entry as a call target and its creation will be deferred until (if ever) the NEW-BB function creates a basic block for that entry. Return instructions simply have an exiting control flow edge.

The DBR 130 places call and return instructions in their own basic block, to make it easier for the INLINE-HOT-CALLS function to modify their control flow, convert them to pseudo-instructions, or delete them. The same is true for indirect control flow instructions with respect to the cascaded indirect control flow transformation.

The DISCOVER-INDIRECT-CODE function attempts to deduce the targets for indirect control transfer instructions beyond those found by DISASSEMBLE-BB. The DISCOVER-INDIRECT-CODE function does this by inspecting the proceeding instructions, including those in proceeding basic blocks. The DISASSEMBLE-BB function cannot do this inspection since the proceeding basic blocks may not have been discovered at that time. If the DISCOVER-INDIRECT-CODE function succeeds it passes the targets to ADD-CONTROL-FLOW. This may add more basic blocks to the work list so the DISCOVER-INDIRECT-CODE function calls PROCESS-WORK-LIST. Performing these two steps can be done repeatedly until no further code is discovered.

A plurality of strategies are used to deduce the targets of indirect control transfer instructions. (1) For indexed memory indirect, the instructions in the basic block and it's predecessor basic blocks are inspected to determine if a jump table is being indexed. This is recognized by the index bounds check code. An attempt is also made to determine the address of the table (e.g., the access may use an absolute or IP relative base address). Knowing the table address, index range, and access size being used, a check is made to see if the table is in read-only memory, and if so the contents are read to obtain the target addresses. This approach can handle the code idioms generated by common compilers for switch table. (2) For register indirect, the immediately proceeding instructions are inspected, possibly going back to predecessor basic blocks, to locate the one that defines the register. If it is a load instruction then (1) above can be checked, otherwise the targets are determined in the same way as used by the DISASSEMBLE-BB function. This approach can handle the code idioms generated by common compilers for indirect calls. If a HPM that provides branch target information directly is available, that it can be used instead of this strategy.

The MARK-UNPATCHABLE function ensures that patching an instruction does not corrupt the bytes contained in overlapping instructions. The MARK-UNPATCHABLE function does this by walking the mapping and marking as unpatchable all the basic blocks associated with entries that overlap with other entries. This is done regardless of whether the other entry has a basic block, since the presence of an entry signifies a control transfer to that address was detected, even if it turned out to be unsupported or not explored due to exceeding the jumps-from-hot limit. The parent entry information is used to detect overlapping entries.

In addition, the MARK-UNPATCHABLE function prevents patching bytes that are not in fact instructions by marking basic blocks as unpatchable if they are not reachable from basic blocks that are known to have executed. This operation walks the control flow graph, starting from basic blocks that contain instructions with samples, and follows successor control flow edges. Call instruction fall-through control flow edges are ignored as the call may not actually return, as discussed earlier. This operation is aided by DISASSEMBLE-BB providing information about the first instruction with a sample, and by the other entry operations maintaining it with help from the instruction boundary information. Before walking the control flow graph, this operation partitions the basic blocks into three sets: unexecuted are the basic blocks that do not have a sample, partial have a sample but not at the first instruction, and executed have a sample on the first instruction. All the partial and executed basic blocks are added to a work list. The basic blocks on the work list are then processed by this operation. Each basic block is processed by removing it from the work list and following its successor control flow edges. When a call control flow edge is followed, the corresponding call target basic block is used as the target. However, the call fall-through control flow edge is ignored because the call may not actually return. For other control flow edges, the target is used directly. If the target is in the unexecuted set, it is moved to the executed set and added to the work list since it never was originally; if in the partial set, it is moved to the executed set since the first instruction is now known to be reachable from an executed instruction of some other basic block; otherwise, it is already in the executed set and can be ignored. When the work list becomes empty: (1) all basic blocks remaining in the unexecuted set are marked as unpatchable, and (2) all basic blocks in the partial set are split just before the first instruction with a sample and the basic block corresponding to the top part is marked as unpatchable.

Once hot code discovery is complete the mapping structure is deleted.

FIG. 11 shows a pseudo code representation of a code partitioning operation. More specifically, the DBR 130 now has one large super-region that consists of a set of basic blocks, as well as the control flow edges the DBR has discovered between them. This super-region will tend to include multiple independent connected subgraphs corresponding to independent areas of hot code. Since there is no control flow between the subgraphs, the DBR 130 can generate replacement code for the subgraphs independently, which will be more efficient.

Processing the subgraphs independently results in the benefit of code locality for each hot area. This processing also allows each hot area to be managed separately (e.g., unpatching areas that cease to be hot while keeping those that remain hot). Furthermore, code discovery deliberately represents calls so that the code for different routines will be in disjoint subgraphs. The inliner heuristics are more effective at estimating the amount of inlining to perform if they can operate on the routines independently.

For these reasons, the DBR 130 partitions the code into disjoint subgraphs and places each one in a separate super-region. To support traditional compiler analysis (e.g., dominator and post-dominator and loop nesting) the DBR 130 also add the entry and exit edges necessary to ensure that all basic blocks are reachable from the start basic block, and all basic blocks can reach the tail basic block.

More specifically, the function PARTITION-CODE first calls the function SEPARATE-CONNECTED-COMPONENTS, which identifies each connected component (CCs) by walking both the predecessor and successor control flow edges from a seed basic block, ignoring the entry and exit control flow edges. Each connected component is moved to its own super-region, and the associated entry and exit edges are attached to that super-region's start and tail basic blocks.

Then the function CONNECT-TERMINALS is called on each super-region. This function first computes the strongly connected components (SCCs) of the super-region. These are the maximal subgraphs in which every basic block is reachable from every other basic block. The start/tail basic blocks are always be in a strongly connected component of their own because these blocks have no predecessor/successor control flow edges so cannot be in a cycle with other basic blocks. Since strongly connected components are maximal, the control flow between strongly connected components cannot form a cycle. Therefore, only the strongly connected components (excluding the start/tail strongly connected components) that do not have a control flow edge from another strongly connected component need to be connected to the start basic block (any basic block in them will do since they form a cycle) because all the other strongly connected components are reachable from them. Similarly, exit edges only need to be added to the strongly connected components that do not have a control flow edge to another strongly connected component (again, any basic block will do). The prior presence of entry and exit edges will obviate the need for adding additional ones. Adding an exit edge is rare since it only needs to be added if the client code actually has an infinite loop.

Only control transfer instructions provide HPM sample information that can be used to set control flow edge sample counts. Any basic block that ends with a non-control transfer instruction will have a fall-through-only control flow edge that does not have a sample count. The COMPUTE-FALL-THROUGH-ONLY function computes an approximation for these counts. This function first makes fall-through-only chains comprised of maximal paths that only include fall-through-only control flow edges. If overlapping code causes multiple basic blocks to fall-through to the same basic block then it arbitrarily chooses one and ignores the others. There can be no cycles since it is only possible to fall-through to an instruction with a higher address.

For all chains that do not have the start basic block as a predecessor the COMPUTE-FALL-THROUGH-ONLY function scans forward deducing the successor fall-through control flow edge count by adding the predecessor control flow edge counts together and subtracting the non-fall-through successor control flow edge counts. By starting at the top of a maximal chain, the COMPUTE-FALL-THROUGH-ONLY function determines that any fall-through predecessor will have had its sample count computed before using it.

Since the COMPUTE-FALL-THROUGH-ONLY function does not have sample counts for the pseudo entry edges, chains starting with these cannot be scanned forward. Instead, the COMPUTE-FALL-THROUGH-ONLY function scans these chains backwards deducing the predecessor fall-through control flow edge count by adding the successor control flow edge counts together and subtracting the non-fall-through predecessor control flow edge counts. Again the successor fall-through counts are computed before they are used. Chains that have both an entry and exit edge are unlikely and the COMPUTE-FALL-THROUGH-ONLY function simply assumes the pseudo-control flow edges have a count of 0.

The INLINE-HOT-CALLS function connects call basic blocks to a clone of the basic blocks that are the target of the call. The cloning starts at the associated call target basic block, and follows control flow up to return basic blocks, which are in turn connected to the successor of the original call basic block. Since super-regions only contain the hot code, the inliner is actually performing partial inlining of the hot paths. Any exiting edges in the called routine become exiting edges in the cloned basic blocks.

The INLINE-HOT-CALLS function replaces the original call and inlined return instructions with pseudo-instructions that are expanded later by the inlined call return address transformation. This operation allows optimization of the call method. In the worst case, the inlined call return address transformation pushes the original client address on the stack in case an exiting edge returns to client code that executes a real return instruction. Even if the inlined call return address transformation can avoid pushing the return address (because there are no exiting edges), the inlined call return address transformation still may need to leave a gap for the address on the stack unless the inlined call return address transformation can change all the stack access offsets in the cloned basic blocks appropriately.

The cloned basic blocks are in fact a specialization of the original routine for a specific call site. Therefore it would only be legal for the client code to enter them directly if the code was actually executing the routine when called from that call site. Since patch points are agnostic about the call context and can only go to a single destination in replacement code, the safest thing is never to patch an inlined basic block. This is achieved by marking all inlined basic blocks as unpatchable. Note that inlining does not delete the original routine basic blocks. Therefore, a replacement code version of the routine is generated which has patch points, and it is this non-specialized version that can be entered if the inlined clone exits.

For indirect calls, hot code discovery creates multiple control flow edges for the known targets. The INLINE-HOT-CALLS function inlines each of these normally and converts the call to a pseudo-call-dispatch instruction. This is converted to a cascade of tests as part of the indirect control flow transformation.

The INLINE-HOT-CALLS function computes the call graph for all the super-regions and iteratively inlines call sites that meet all the following requirements: (1) The call basic block is hot. The INLINE-HOT-CALLS function uses the sample counts to determine which calls are hot and worth inlining, and can inline a routine that contains non-inlined calls (perhaps because they were on cold paths). (2) The routine containing the call basic block is still within the budget heuristic. The INLINE-HOT-CALLS function monitors the amount of code expansion it is performing and avoids excessive code explosion that would adversely affect the benefits of code locality or overflow the shared memory. Having code for separate routines in their own individual super-regions makes this easy, each super-region has its own budget. (3) The call target basic block is known (this is not the unknown-target of an indirect call). (4) There is a path from the call target basic block to at least one return basic block. It is only worth inlining if the INLINE-HOT-CALLS function can connect the cloned basic blocks back to the caller so the DBR 130 can discover complete interprocedural loops. Routines with multiple entries are supported, and each call target basic block can have its own set of return basic blocks. (5) The called routine has no hot call sites. Processing call sites from the leaves upwards ensures a routine is only inlined after it has already had inlining performed on itself. It also avoids inlining (possibly mutual) recursive routines which form cycles in the call graph and so can never be leaves.

The INLINE-HOT-CALLS function scales the counts on the cloned basic block and control flow edges to be consistent with the counts on the call. Although this does not necessarily result in the cloned counts reflecting the actual behavior of this call site, it is an approximation. The INLINE-HOT-CALLS function also subtracts the cloned counts from the original basic block and control flow edges so that the resulting counts reflect the fact that they are no longer executed by this call site.

The client process must never execute a call instruction in replacement code because the return address pushed would be within replacement code. Pushing a return address within replacement code has two problems: the client program may be using exception mechanisms that inspect return addresses when choosing handlers; and the replacement code may be unpatched, and it would be hard to find and update all the pushed return addresses. To avoid this, the INLINE-HOT-CALLS function deletes any call basic blocks that are not inlined. The call basic block's predecessor control flow edges are made exiting edges by connecting them to the tail basic block. The INLINE-HOT-CALLS function calls the CONNECT-TERMINALS function to add any necessary entry control flow edges to the call basic block successor basic blocks. This can cause the super-regions to have multiple connected components, but this is handled by the partitioning performed by the PRUNE-CODE function.

FIG. 12 shows a pseudo code representation of a patch point selection operation. Due to architectural constraints of certain types of process architectures, not every instruction in the client code may be suitable for patching. For example, in the x86 processor architecture, a 5-byte branch instruction, comprising a 1-byte opcode followed by a 4-byte offset, is used to transfer to the replacement code. Therefore, only client instructions greater than 5 bytes can be patched. Patching a smaller instruction could overwrite more than one instruction; if one of those following instructions was the target of a branch, the patch would corrupt the program.

An additional difficulty is the ability to safely modify code that may be being executed concurrently by another processor on a multi-processor architecture. This problem may also be encountered by managed code systems (e.g., Java virtual machines) and solutions are available, but they can put additional constraints on the client instructions that can be patched. A solution for an AMD x86 processor is: (1) If the bytes do not span an aligned 8-byte boundary then just write them. Otherwise: (2) Write a 2-byte self-branch instruction to the first two bytes. To be atomic, the write should not span an aligned 8-byte boundary. (3) Wait to ensure that all processors have completed their instruction fetches that were started before the previous write as they may be fetching the original instruction. (4) Write the next 3 bytes (the last 3 bytes of the offset). (5) Rewrite the first 2 bytes with the branch opcode and the first byte of the offset. As can be seen, this puts an additional constraint on which client instructions can be patched on an AMD type x86 architecture. Other architectures may have similar constraints.

An observation is that hot code is comprised of loops that are executed many times once entered. The loops may be large and span over many routines, but straight line code by itself only takes so long to execute and so cannot be hot. The DBR 130 discovery operation creates super-regions (which permit arbitrary control flow), so is capable of identifying complete loops. However, since the DBR 130 only explores hot code, there may be paths within the loops that are occasionally executed but are not part of super-regions and exit back to client code. If such a path tends to be executed in an early iteration of the loop, control may return to client code, where control will remain until the next time the hot super-region is entered. So, even though the DBR 130 successfully identifies the hot path of the loops, the DBR 130 may not remain in the super-region for all the loop iterations. A solution to this issue is to attempt to place patches in the loop body so, if such a path is taken, the loop will be re-entered on the next iteration. Adding such patches to inner loops as well may tend to limit transformations.

Finally, there are two other restrictions. First, some basic blocks should never be patched (i.e., those cloned by the inliner and those identified by the MARK-UNPATCHABLE value). Second, the cost of installing patches is often relatively high (requiring system calls to change page protections and flush caches), so it is desirable for the DBR 130 to minimize the number of patches in each super-region.

The PATCH-POINT-SELECTION function aims to address these challenges by modifying the entry edges to only reference basic blocks that start with an instruction that can be patched, and to find a minimal set of patches that cover the loops of the super-region. Since the inliner often requires super-regions that are complete routines and is not encumbered by the patching restrictions, the DBR 130 performs the selection after the inliner operation.

More specifically, the PATCH-POINT-SELECTION function starts by computing a loop nest structure. Then the set of patch points is determined. This is done at the basic block granularity, insensitive to whether a patchable basic block's first instruction is actually patchable. The PATCH-POINT-SELECTION function then removes the old entry edges, splits any patch point basic blocks that do not start with a patchable instruction, and creates new entry edges to them. This minimizes splitting to just the basic blocks that need it.

Conceptually the PATCH-POINT-SELECTION function determines a complete set of patchable basic blocks, and then minimizes this set by removing any basic block that is reachable from some other basic block in the set (there is no need to have both). The PATCH-POINT-SELECTION function can use the dominator relationship to determine reachability. However, for loops, the PATCH-POINT-SELECTION function can also use the post-dominator relationship because the loop's back edge ensures that the control flow can reach any basic block in the same loop that it post-dominates. It is preferable to patch basic blocks in outer loops because patching to an inner loop may limit the transformation potential for loops. To achieve this, the PATCH-POINT-SELECTION function processes the loop hierarchy starting at the outermost loop.

The root loop of the loop hierarchy is not actually a loop, but a placeholder that contains the nested loops. This allows super-regions that start with sequential code that leads to a series of loops to be represented. For this reason the PATCH-POINT-SELECTION function maintains two sets of patches while processing, the root patches that are not within a loop, and the loop patches that are. The post-dominator relationship is not used when comparing with the root patches.

The PATCHES function is used to identify the set of patch basic blocks for a single loop. The function first determines a set of candidate basic blocks for the loop's body. A basic block is a candidate if the basic block is patchable and not reachable from one of the existing root or loop patches. The function then minimizes this candidate set by pairwise comparing each member with each other member, removing one if it is reachable from another. By processing the loop's basic blocks in depth-first search (DFS) order, the PATCH-POINT-SELECTION function chooses the earlier of two basic blocks in a loop body that are mutually reachable. This is not strictly necessary because either will suffice, but is a more intuitive choice. Reachability is determined by the SUPERCEDES function, which uses the dominator and post-dominator relationships appropriately.

The NESTED-PATCHES function is used to process a loop together with its nested loops top-down. The function inspects the basic blocks of its loop body before recursing to examine its child loops. Any patches chosen are unioned with any previous loop patches and so may act to supercede the candidates of other nested loops. The NESTED-PATCHES function processes the nested loops in DFS order so that the earlier loops are favored. A later nested loop may supersede an earlier nested loop, but the DBR 130 would still rather have a patch in the earlier one so that the replacement code is entered on the first iteration of the enclosing unpatchable loop.

The PATCH-POINT-SELECTION function essentially performs the same function as the NESTED-PATCHES function does for the root loop. The function uses the PATCHES function on the root loop, but specifies to only use the dominator relationship, and puts the result in the root patches. It then uses the NESTED-PATCHES function for each of its nested children. However, since the root loop is not a loop, the function adds any child loop patches to the root patches.

The patch point operation aims to patch the outer loops, which benefits transformation. If an inner loop tends to follow an exiting edge in an early iteration, then after installing the replacement code, the nested loop will still be hot. Since the hot code discovery does not explore past already installed patches, the operation will tend to find just the nested loop, which will be transformed independently. This general approach is amenable to modification (e.g., by analyzing to see if a loop has any exiting edges and processing the loops innermost outwards).

In the last step of the DBR 130 region selection, the PRUNE-CODE function prunes the code that has been discovered. One goal is to end up with super-regions of hot code that will benefit from transformation. The PRUNE-CODE function removes any unreachable basic blocks that were caused when the PATCH-POINT-SELECTION function changed the entry edges.

The PRUNE-CODE function also prunes any cold tail basic blocks that cannot reach a hot basic block but simply exit the super-region. These are often the consequence of the jumps-from-hot throttling mechanism of hot code discovery. Since they are not hot, and will always transfer back to client code, there is no benefit to including them in the super-region; instead, the replacement code may simply transfer back to client code earlier. Including these basic blocks simply provides more work for the worker thread and, since this code will be placed in the cold code buffer, it can lead to an additional jump being required. They are identified by placing all cold basic blocks in a cold set and all hot basic blocks on a work list. The basic blocks of the work list are processed by inspecting all their predecessors, and those in the cold set are added to the work list since they can reach a hot basic block. The basic blocks remaining in the cold set are deleted, but any of their predecessor control flow edges that are from a basic block not in the cold set are changed to an exit edge and connected to the tail basic block.

Calling the SEPARATE-CONNECTED-COMPONENTS function again is beneficial due to the control flow changes made by the inliner, patch point selection, and cold tail basic block removal. This ensures each super-region only contains a single connected component once again and so will be inspected individually by the following pruning actions.

Super-regions that do not include loops that execute multiple iterations are unlikely to benefit from transformation because the cost of the patch jump and jump back will likely outweigh any transformation gains. The DBR 130 examines the loop nesting and use the control flow edge counts to estimate the average number of times the loops are iterated. Those super-regions without any loops that exceed the threshold are deleted (this includes super-regions with no loop at all). Finally, the DBR 130 also deletes super-regions that are very small because these super-regions are unlikely to have enough code that can be improved.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that other processor architectures and HPM implementations are contemplated.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A dynamic binary rewriter (DBR) framework comprising:
   a hardware performance monitor contained within a processor, the hardware performance monitor sampling one or more client processes;
   a DBR service, the DBR service executing as a separate process, the DBR service configured to:
      aggregate samples from the hardware performance monitor;
      perform region selection to identify a frequently executed code section in the one or more client processes;
      optimize the selected region; and
      generate replacement code for the selected region, wherein the replacement code is functionally equivalent to original code of the selected region; and
   a DBR agent, the DBR agent executing within the one or more client processes, the DBR agent patching the one or more client processes to use the replacement code.

2. The DBR framework of claim 1 wherein:
   the hardware performance monitor uses sampling to collect a plurality of types of information regarding execution of the one or more client processes; and,
   the DBR services use the plurality of types of information when performing region selection.

3. The DBR framework of claim 1 wherein:
   at startup of the one or more client processes the DBR agent is automatically loaded into a client process address space of the respective one or more client processes and is initialized; and,
   the DBR agent performs patching and unpatching of replacement code and reporting necessary system library usage without imposing significant additional resource requirements on the one or more client processes.

4. The DBR framework of claim 3 wherein:
   initialization of the DBR agent creates a new thread within the one or more client processes, the DBR agent operating within the new thread.

5. The DBR framework of claim 1 wherein:
   decoupling the DBR service from the one or more client processes allows the DBR service to execute concurrently with the one or more client processes, utilizing one or more separate cores if available, while minimizing memory usage and avoiding shared libraries within the one or more client processes.

6. The DBR framework of claim 1 wherein:
   decoupling the DBR service from the one or more client processes allows the DBR service to manage multiple client processes so as to allow system resources used by the DBR to be coordinated.

7. The DBR framework of claim 1 wherein:
   decoupling the DBR service from the one or more client processes allows the DBR service to operate continuously taking snapshots of the client processes being managed and removing or creating new replacements as necessary.

8. The DBR framework of claim 1 wherein:
the DBR service comprises a DBR control thread, with the DBR control thread managing communication with the DBR agent and coordinating aspects of the DBR service.

9. The DBR framework of claim 1 wherein:
the DBR service comprises one or more worker threads, with each worker thread performing a region selection operation, region transformation operation and replacement code generation operation for a client process.

10. The DBR framework of claim 1 wherein:
the DBR service and the DBR agent communicate via memory shared between the DBR service and the DBR agent.

11. A method for providing a dynamic binary rewriter (DBR) comprising:
utilizing a hardware performance monitor, the hardware performance monitor sampling one or more client processes;
providing a DBR service, the DBR service executing as a separate process;
aggregating samples from the hardware performance monitor;
performing region selection to identify a frequently executed code section in the one or more client processes;
optimizing the selected region; and
generating replacement code for the selected region via the DBR service, wherein the replacement code is functionally equivalent to original code of the selected region;
providing a DBR agent,
executing the DBR agent within the one or more client processes;
patching the one or more client processes via the DBR agent to use the replacement code.

12. The method of claim 11 wherein:
the hardware performance monitor uses sampling to collect a plurality of types of information regarding execution of the one or more client processes; and,
the DBR services uses the plurality of types of information when performing region selection.

13. The method of claim 11 wherein:
at startup of the one or more client processes the DBR agent is automatically loaded into a client process address space and is initialized; and,
the DBR agent performs patching and unpatching replacement code and reporting necessary system library usage without imposing significant additional resource requirements on the one or more client processes.

14. The method of claim 13 wherein:
initialization of the DBR agent creates a new thread within the one or more client processes, the DBR agent operating within the new thread.

15. The method of claim 11 wherein:
decoupling the DBR service from the one or more client processes allows the DBR service to execute concurrently with the client process, utilizing one or more separate cores if available, while minimizing memory usage and avoiding shared libraries within the one or more client processes.

16. The method of claim 11 wherein:
decoupling the DBR service from the one or more client processes allows the DBR service to manage multiple client processes so as to allow system resources used by the DBR to be coordinated.

17. The method of claim 11 wherein:
decoupling the DBR service from the one or more client processes allows the DBR service to operate continuously taking snapshots of the client processes being managed and removing or creating new replacements as necessary.

18. The method of claim 11 wherein:
the DBR service comprises a DBR control thread, with the DBR control thread managing communication with the DBR agent and coordinating aspects of the DBR service.

19. The method of claim 11 wherein:
the DBR service comprises one or more worker threads, with each worker thread performing a region selection operation, region transformation operation and replacement code generation operation for a client process.

20. The method of claim 11 wherein:
the DBR service and the DBR agent communicate via memory shared between the DBR service and the DBR agent.

* * * * *